US009768670B2

(12) United States Patent
Kim et al.

(10) Patent No.: US 9,768,670 B2
(45) Date of Patent: Sep. 19, 2017

(54) MOTOR WITH A SHAFT SCREW AND SENSOR MAGNET THEREUNDER

(71) Applicant: LG INNOTEK CO., LTD., Seoul (KR)

(72) Inventors: Seong Jin Kim, Seoul (KR); Jinho Kim, Seoul (KR); Kyung Sang Park, Seoul (KR); Chang Hyun Park, Seoul (KR); Woo Seob Shim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 423 days.

(21) Appl. No.: 14/499,379

(22) Filed: Sep. 29, 2014

(65) Prior Publication Data

US 2015/0091402 A1  Apr. 2, 2015

(30) Foreign Application Priority Data

Oct. 2, 2013 (KR) .......................... 10-2013-0117725

(51) Int. Cl.
    *H02K 11/00* (2016.01)
    *H02K 7/06* (2006.01)
    *H02K 5/22* (2006.01)
    *H02K 7/116* (2006.01)
    *H02K 11/215* (2016.01)
    *H02K 11/33* (2016.01)

(52) U.S. Cl.
    CPC ......... *H02K 11/0021* (2013.01); *H02K 5/225* (2013.01); *H02K 7/06* (2013.01); *H02K 7/116* (2013.01); *H02K 11/0094* (2013.01); *H02K 11/215* (2016.01); *H02K 11/33* (2016.01); *H02K 2203/03* (2013.01); *H02K 2203/06* (2013.01)

(58) Field of Classification Search
    CPC ........ H02K 5/225; H02K 7/116; H02K 11/33; H02K 7/06; H02K 11/0094; H02K 11/215; H02K 11/0021
    See application file for complete search history.

(56) References Cited

U.S. PATENT DOCUMENTS 5,637,940 A * 6/1997 Nagai ...................... B23Q 1/58
                                                        310/80
5,785,145 A    7/1998 Wakao et al.
6,123,167 A    9/2000 Miller et al.
(Continued)

FOREIGN PATENT DOCUMENTS

DE    102013201525 A1    8/2013
EP       2475079 A2      7/2012

OTHER PUBLICATIONS

European Search Report dated Feb. 16, 2015 in European Application No. 14187267.

*Primary Examiner* — Naishadh Desai
(74) *Attorney, Agent, or Firm* — Saliwanchik, Lloyd & Eisenschenk

(57) ABSTRACT

Provided is a motor including a rotor section including a rotor core, a drive magnet attached to the rotor core, and a screw disposed in the rotor core and rotated with the rotor core; a nut member coupled to the screw and vertically moved upon rotation of the rotor section; a stator section disposed to be opposite to the rotor section; a sensor magnet disposed under the screw; and a circuit board on which a magnetic device disposed to be opposite to the sensor magnet is mounted.

13 Claims, 2 Drawing Sheets

(56) References Cited

U.S. PATENT DOCUMENTS

| | | | | |
|---|---|---|---|---|
| 6,570,282 B1* | 5/2003 | Ito | ............... | F16H 25/2204 |
| | | | | 310/75 R |
| 8,169,111 B2* | 5/2012 | Yoshimura | ............ | H02K 29/12 |
| | | | | 310/216.121 |
| 2004/0222706 A1* | 11/2004 | Ickinger | ............ | B29C 45/5008 |
| | | | | 310/83 |
| 2005/0218727 A1* | 10/2005 | Gandel | ............ | H02K 7/06 |
| | | | | 310/80 |
| 2012/0160043 A1* | 6/2012 | Drumm | ............ | F16H 25/20 |
| | | | | 74/89.23 |
| 2012/0176073 A1* | 7/2012 | Amagasa | ............ | H02K 7/116 |
| | | | | 318/400.38 |
| 2013/0270972 A1* | 10/2013 | Kato | ............ | H02K 11/215 |
| | | | | 310/68 B |

* cited by examiner

MOTOR WITH A SHAFT SCREW AND SENSOR MAGNET THEREUNDER

CROSS-REFERENCES TO RELATED APPLICATION

This application claims the benefit under 35 U.S.C. §119 of Korean Patent Application No. 10-2013-0117725, filed Oct. 2, 2013, which is hereby incorporated by reference in its entirety.

BACKGROUND

Technical Field

The present invention relates to a motor.

Related Art

In general, a motor has an exterior formed by coupling a housing and a cover member, and a stator is disposed at an inner circumferential surface of the housing. A rotor is disposed at a center of the stator to be rotated according to an electromagnetic interaction with the stator. However, in general, since the rotor is formed by stacking a plurality of cores, responsibility of the motor may be decreased due to the weight thereof.

Meanwhile, the motor may further include a detection unit configured to detect a rotational amount thereof. The detection unit may include a sensor magnet and a hall integrated chip (IC). The sensor magnet may be mounted on a plate disposed over the rotor, and emits a magnetic flux or a polarity according to rotation of the rotor section. The hall IC is disposed to be opposite to the sensor magnet, and detects the magnetic flux or the polarity emitted from the sensor magnet to detect rotation of the rotor.

Since a separate mechanism is needed to mount the sensor magnet on the plate, it is difficult to reduce a size of the motor. In addition, when the sensor magnet is mounted on the plate, since rotational inertia of the rotor section is increased, responsibility may be decreased.

BRIEF SUMMARY

The present invention is directed to provide a motor.

According to an aspect of the present invention, there is provided a motor including a rotor section including a rotor core, a drive magnet attached to the rotor core, and a screw disposed in the rotor core and rotated with the rotor core; a nut member coupled to the screw and vertically moved upon rotation of the rotor section; a stator section disposed to be opposite to the rotor section; a sensor magnet disposed under the screw; and a circuit board on which a magnetic device disposed to be opposite to the sensor magnet is mounted.

The rotor section may further include a screw fixing member configured to surround an outer circumferential surface of at least a portion of the screw.

The sensor magnet may be mounted on the screw fixing member.

The screw fixing member may include a hollow space, an inner surface of the hollow space may surround the outer circumferential surface of at least the portion of the screw, and the sensor magnet may be mounted in the hollow space.

At least a portion of the sensor magnet may be surrounded by the inner surface of the hollow space.

The sensor magnet may be spaced apart from a lower end of the screw.

The rotor section may further include a tube press-fitted between the inner circumferential surface of the rotor core and the outer circumferential surface of the screw fixing member.

The motor may further include a connecting section connected to a control unit.

The connecting section may include a first connecting unit connected to the circuit board; and a second connecting unit configured to connect the first connecting unit and the control unit.

The second connecting unit may be disposed over the motor.

The first connecting unit may be a wire guided to the second connecting unit in the housing, and the second connecting unit may include a sensor terminal configured to transmit a signal received from the first connecting unit to the control unit, a power terminal configured to transmit an input signal received from the control unit to a coil wound on the stator section, and a bus bar configured to bind the coil.

The motor may further include a guide pipe formed at an inner wall of the housing to guide the first connecting unit.

The first connecting unit may be disposed under the motor.

The first connecting unit may include a bus bar configured to bind the coil wound on the stator section, and a connecting terminal connected to the second connecting unit, and the second connecting unit may include a power terminal configured to transmit an input signal from the control unit to the coil, and a sensor terminal configured to transmit the signal detected by the detection unit to the control unit.

The second connecting unit may be at least one wire extending to the outside of the housing and connected to the control unit.

The control unit may be at least one of a hydraulic control unit (HCU) and an electronic control unit (EDU).

The nut member may be coupled to the screw by a ball screw.

The screw fixing member may be disposed to be spaced apart from the nut member under the nut member.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
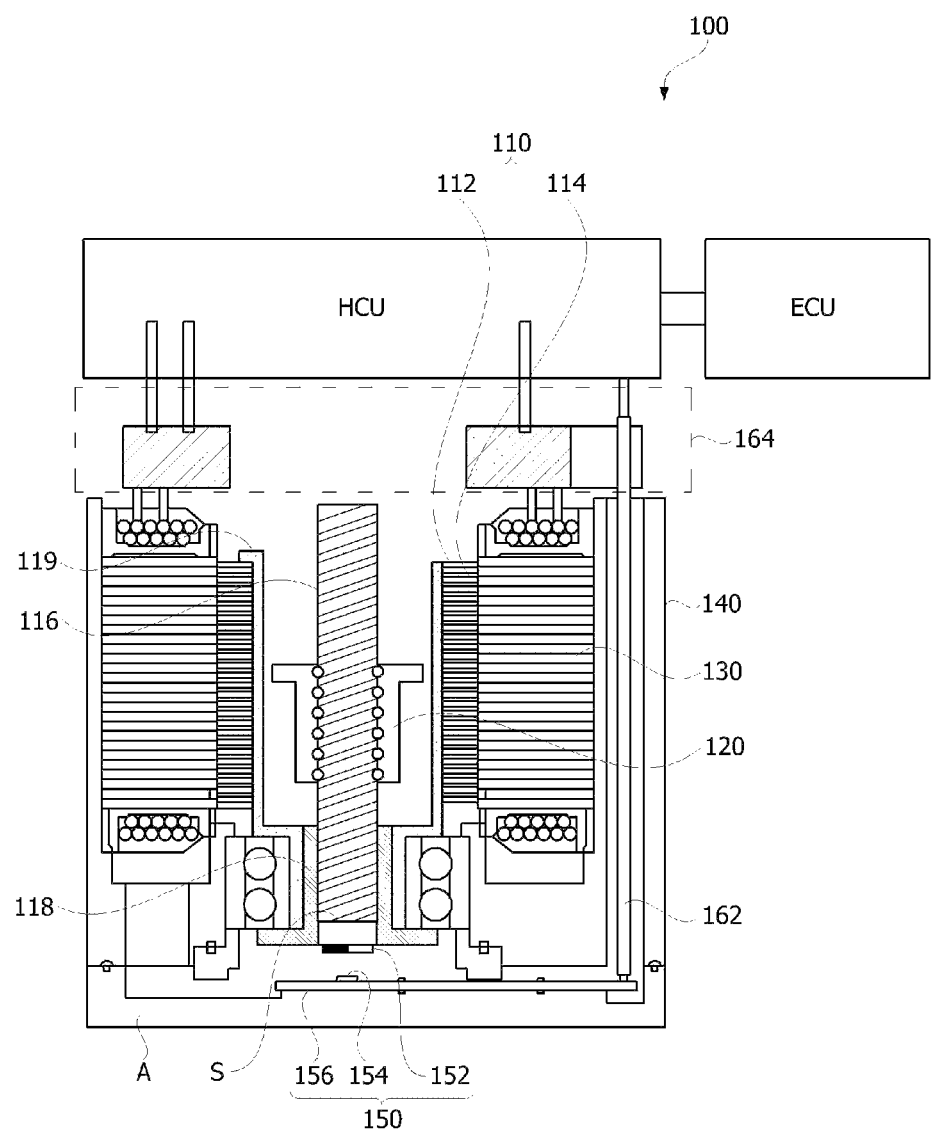
FIG. 1 is a cross-sectional view of a motor according to an embodiment of the present invention.

The present invention may be variously modified and may include various embodiments, and specified embodiments will be described with reference to the accompanying drawings. However, the present invention is not limited to the specified embodiments, and should be understood to include all modifications, equivalents and substitutions, which will fall into the spirit and the technical scope of the present invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. Similarly, when it is described that a method includes series of steps, a sequence of the steps is not a sequence in which the steps should be performed in the sequence, an arbitrary technical step may be omitted and/or another arbitrary step, which is not disclosed herein, may be added to the method.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Terms used herein are provided for explaining embodiments of the present invention, not limiting the invention. As used herein, the singular forms "a'," "an" and "the" are intended to include the plural forms as well, unless the context clearly indicates otherwise. It will be further understood that the terms "comprises" and/or "comprising," when used in this specification, specify the presence of stated components, motions, and/or devices, but do not preclude the presence or addition of one or more other components, motions, and/or devices thereof.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

Hereinafter, the embodiments will be described in detail with reference to the accompanying drawings, but the same or corresponding components are designated by the same reference numerals, and detailed description thereof will be omitted.

Figure 2:
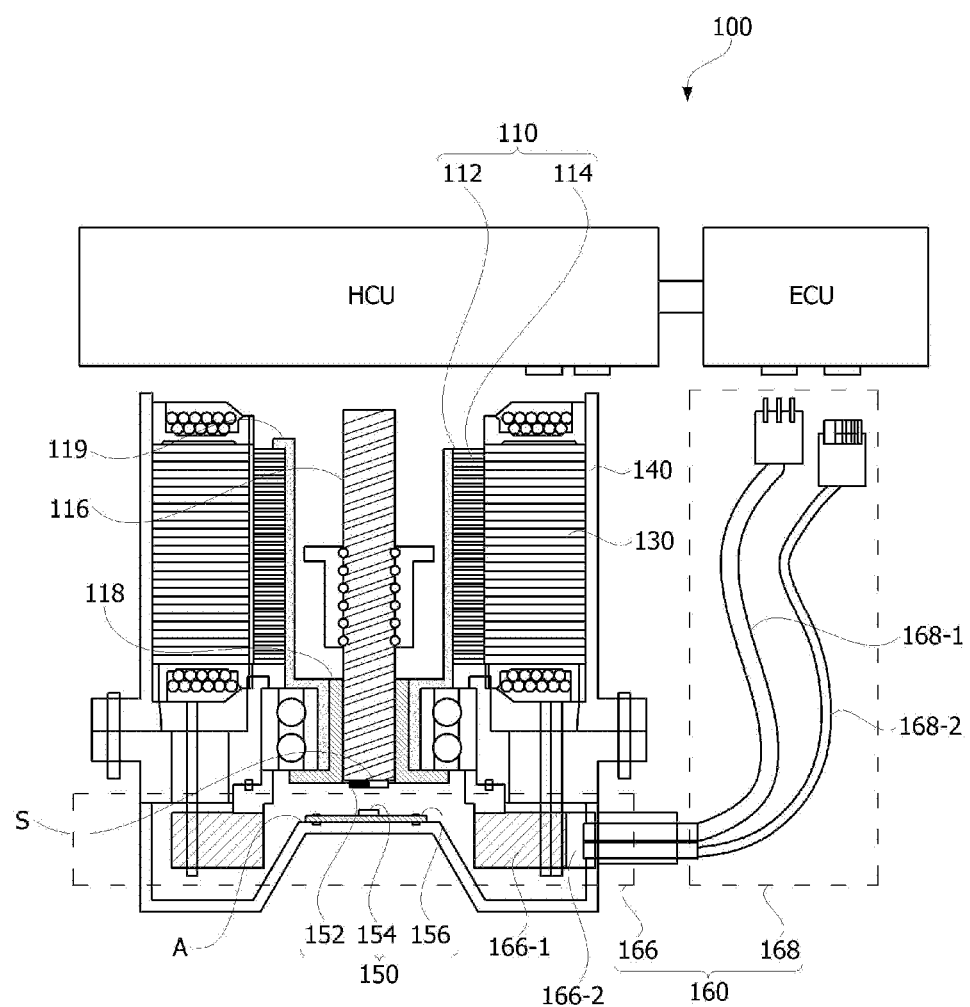
FIG. 2 is a cross-sectional view of a motor according to another embodiment of the present invention.

FIG. 1 is a cross-sectional view of a motor according to an embodiment of the present invention, and FIG. 2 is a cross-sectional view of a motor according to another embodiment of the present invention.

Referring to FIGS. 1 and 2, a motor 100 includes a rotor section 110, a nut member 120, a stator section 130 disposed opposite to the rotor section 110, a housing 140 configured to accommodate the rotor section 110 and the stator section 130, and a detection unit 150 configured to detect rotation of the rotor section 110.

The housing 140 accommodates the rotor section 110 and the stator section 130 in an inner space thereof. An upper portion of the housing 140 is coupled to a cover (not shown) close the rotor section 110 and the stator section 130. Structures of the housing 140 and the cover may be variously modified according to necessity.

The rotor section 110 includes a rotor core 112, a drive magnet 114 attached to the rotor core 112, and a screw 116 disposed in the rotor core 112 and rotated with the rotor core 112. In addition, the rotor section 110 further includes a screw fixing member 118 surrounding the outer circumferential surface of the screw 116 and configured to fix the screw 116. The screw fixing member 118 includes a hollow space, and an inner surface of the hollow space may be formed to surround the outer circumferential surface of the screw 116. The screw fixing member 118 may be coupled to the screw 116 by a bolt, and may be disposed under the nut member 120 to be spaced a predetermined gap from the nut member 120.

The nut member 120 is coupled to the screw 116 to vertically move upon rotation of the rotor section 110. The nut member 120 may be coupled to the screw 116 by a ball screw.

The stator section 130 includes coils wound on a plurality of stator cores and a plurality of stator cores. An end of the coil wound on the stator core is connected to an input/output terminal by a bus bar to be connected to a power supply. Here, the power supply may be a three-phase power supply.

When current is applied to the stator section 130, the rotor section 110 is rotated by an interaction between the stator section 130 and the rotor section 110.

The detection unit 150 detects a rotational angle and a rotational speed of the rotor section 110, a position of the drive magnet, and so on. For this, the detection unit 150 may include a sensor magnet and a magnetic device, for example, a circuit board on which a hall IC is mounted. The sensor magnet is rotated with the rotor section 110, and emits a magnetic flux or a polarity according to rotation of the rotor section 110. The hall IC detects the magnetic flux or the polarity emitted from the sensor magnet to detect the rotational angle or the rotational speed of the rotor section.

According to the embodiment of the present invention, the detection unit 150 is disposed under the motor, i.e., between a lower end S of the screw 116 and a bottom surface A of the housing 140. For example, a sensor magnet 152 is mounted under the screw 116, and a hall IC 154 may be disposed to be opposite to the sensor magnet under the sensor magnet 152. For this, the sensor magnet 152 may be mounted in a hollow space of a screw fixing member 118 and may be spaced a predetermined gap from the lower end S of the screw 116. For example, at least a portion of the sensor magnet 152 may be surrounded by an inner surface of the hollow space of the screw fixing member 118. For this, at least a portion of the sensor magnet 152 may be pressed against the hollow space of the screw fixing member 118. In addition, a groove on which at least the portion of the sensor magnet 152 is mounted may be formed at the inner surface of the hollow space of the screw fixing member 118.

In addition, the rotor section 110 further includes a tube 119 press-fitted between the inner circumferential surface of the rotor core 112 and the outer circumferential surface of the screw fixing member 118.

As described above, when the sensor magnet is mounted in the hollow space of the screw fixing member 118, a size of the sensor magnet may be similar to a diameter of the screw 116. Accordingly, the rotational inertia of the motor can be reduced to increase responsibility. In addition, when the sensor magnet 152 is disposed under the motor, a space for vertical movement of the nut member 120 can be sufficiently secured. In addition, the sensor magnet 152 can be integrally rotated with the rotor section 110 by the tube 119 press-fitted between the inner circumferential surface of the rotor core 112 and the outer circumferential surface of the screw fixing member 118, precisely sensing the rotational angle.

Meanwhile, the motor is connected to a control unit, for example, a hydraulic control unit (HCU) or an electronic control unit (ECU). For this, the motor may further include a connecting section 160 connected to the control unit. The control unit can transmit the input signal to an end of the coil wound on the stator core through the connecting section 160.

In addition, the motor can transmit the signal detected by the detection unit 150 to the control unit through the connecting section 160.

For this, the connecting section 160 may include a first connecting unit and a second connecting unit. The first connecting unit may be connected to the circuit board. In addition, the second connecting unit may connect the first connecting unit and the control unit.

Referring to FIG. 1, a first connecting unit 162 is directly connected to the circuit board, and transmits the signal detected by the detection unit 150 to a second connecting unit 164. In addition, the second connecting unit 164 is disposed over the motor, and transmits the signal received from the first connecting unit 162 to the control unit.

For this, the first connecting unit 162 may be a wire guided to the second connecting unit 164 in the housing. For example, the first connecting unit 162 may extend from the circuit board disposed under the motor, and be guided to the second connecting unit 164 disposed over the motor along the inside of the housing. For this, a guide pipe configured to guide the first connecting unit 162 may be formed at an inner wall of the housing.

In addition, the second connecting unit 164 may be disposed at an upper portion of the motor, for example, at least an upper portion of the rotor section 110 and the stator section 130, and may be disposed inside or outside the housing 140. Here, the second connecting unit 164 may include a sensor terminal configured to transmit the signal received from the first connecting unit 162 to the control unit, a power terminal configured to transmit the input signal received from the control unit to the coil wound on the stator core, and a bus bar configured to bind the coil wound on the stator core.

Accordingly, an additional sealing process for the connecting section is not needed to enable manufacture thereof.

Referring to FIG. 2, a first connecting unit 166 is disposed under the motor, for example, over the bottom surface of the housing 140, and connected to the circuit board and the coil wound on the stator core. In addition, a second connecting unit 168 extends from the first connecting unit 166, and transmits a detection signal received from the first connecting unit 166 to the control unit or transmits a control signal received from the control unit to the first connecting unit 166.

For this, the first connecting unit 166 may include a bus bar 166-1 configured to bind the coil wound on the stator coil, and include a connecting terminal 166-2 connected to the second connecting unit 168. In addition, the second connecting unit 168 may include a power terminal 168-1 configured to transmit the input signal from the control unit to the coil, and a sensor terminal 168-2 configured to transmit a signal detected by the detection unit to the control unit. The power terminal and the sensor terminal may be wires extending to the outside of the housing to be directly connected to the control unit. Accordingly, a degree of freedom of assembly is increased.

The motors according to the embodiments of the present invention can be applied to a brake system for a vehicle. The motors according to the embodiments of the present invention may be, for example, a motor for an integrated brake controller (IBC).

As can be seen from the foregoing, the rotational inertia of the rotor can be reduced, and thus, the response speed of the motor can be increased. In addition, the motor can be miniaturized. Further, since the sensor magnet is rotated with the rotor, the rotational angle can be precisely detected.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A motor comprising:
a rotor section including a rotor core, a drive magnet attached to the rotor core, and a screw disposed in the rotor core and rotated with the rotor core;
a nut member coupled to the screw and vertically moved upon rotation of the rotor section;
a stator section disposed to be opposite to the rotor section;
a sensor magnet disposed under the screw;
a circuit board on which a magnetic device disposed to be opposite to the sensor magnet is mounted; and
a connecting section connected to a control unit,
wherein the connecting section comprises:
a first connecting unit connected to the circuit board; and
a second connecting unit configured to connect the first connecting unit and the control unit,
wherein the second connecting unit is disposed over the motor,
wherein the first connecting unit is a wire guided to the second connecting unit a housing, and
wherein the second connecting unit comprises a sensor terminal configured to transmit a signal received from the first connecting unit to the control unit, a power terminal configured to transmit an input signal received from the control unit to a coil wound on the stator section, and a bus bar configured to bind the coil.

2. The motor according to claim 1, wherein the rotor section further comprises a screw fixing member configured to surround an outer circumferential surface of at least a portion of the screw.

3. The motor according to claim 2, wherein the sensor magnet is mounted on the screw fixing member.

4. The motor according to claim 3, wherein the screw fixing member includes a hollow space,
an inner surface of the hollow space surrounds the outer circumferential surface of at least the portion of the screw, and
the sensor magnet is mounted in the hollow space.

5. The motor according to claim 4, wherein at least a portion of the sensor magnet is surrounded by the inner surface of the hollow space.

6. The motor according to claim 4, wherein the sensor magnet is spaced apart from a lower end of the screw.

7. The motor according to claim 1, wherein the rotor section further comprises a tube press-fitted between the inner circumferential surface of the rotor core and the outer circumferential surface of the screw fixing member.

8. The motor according to claim 1, further comprising a guide pipe formed at an inner wall of the housing to guide the first connecting unit.

9. A motor comprising:
a rotor section including a rotor core, a drive magnet attached to the rotor core, and a screw disposed in the rotor core and rotated with the rotor core;
a nut member coupled to the screw and vertically moved upon rotation of the rotor section;
a stator section disposed to be opposite to the rotor section;

a sensor magnet disposed under the screw;
a circuit board on which a magnetic device disposed to be opposite to the sensor magnet is mounted; and
a connecting section connected to a control unit,
wherein the connecting section comprises:
  a first connecting unit connected to the circuit board; and
  a second connecting unit configured to connect the first connecting unit and the control unit;
wherein the first connecting unit is disposed under the motor,
wherein the first connecting unit comprises a bus bar configured to bind the coil wound on the stator section, and a connecting terminal connected to the second connecting unit; and
wherein the second connecting unit comprises a power terminal configured to transmit an input signal from the control unit to the coil, and a sensor terminal configured to transmit the signal detected by the detection unit to the control unit.

10. The motor according to claim 9, wherein the second connecting unit is at least one wire extending to the outside of a housing and connected to the control unit.

11. The motor according to claim 1, wherein the control unit is at least one of a hydraulic control unit (HCU) and an electronic control unit (ECU).

12. The motor according to claim 1, wherein the nut member is coupled to the screw by a ball screw.

13. The motor according to claim 12, wherein the screw fixing member is disposed to be spaced apart from the nut member under the nut member.

* * * * *